(12) United States Patent
Tyler

(10) Patent No.: US 10,662,679 B2
(45) Date of Patent: May 26, 2020

(54) INVERTIBLE BOAT OUTBOARD MOTOR LOCK

(71) Applicant: Mark Tyler, Battle Ground, WA (US)

(72) Inventor: Mark Tyler, Battle Ground, WA (US)

( * ) Notice: Subject to any disclaimer, the term of this patent is extended or adjusted under 35 U.S.C. 154(b) by 22 days.

(21) Appl. No.: 15/970,487

(22) Filed: May 3, 2018

(65) Prior Publication Data

US 2019/0338564 A1 Nov. 7, 2019

(51) Int. Cl.
*E05B 73/00* (2006.01)
*F16B 41/00* (2006.01)
*B63H 20/02* (2006.01)

(52) U.S. Cl.
CPC ........ *E05B 73/0076* (2013.01); *F16B 41/005* (2013.01); *B63H 20/02* (2013.01)

(58) Field of Classification Search
CPC ... E05B 73/0076; F16B 41/005; B63H 20/02; B63H 20/06
USPC ......... 70/177, 178, 180, 229–232, 461, 462, 70/DIG. 57; 248/551–553
See application file for complete search history.

(56) References Cited

U.S. PATENT DOCUMENTS

| | | | | |
|---|---|---|---|---|
| 2,500,375 A | * | 3/1950 | Parker | E05B 73/0076 70/232 |
| 3,505,839 A | * | 4/1970 | Pavek | E05B 73/0076 70/230 |
| 3,693,383 A | * | 9/1972 | Krupen | E05B 73/0076 70/232 |
| 3,729,963 A | * | 5/1973 | Hintz | E05B 73/0076 70/230 |
| 3,745,797 A | * | 7/1973 | Pavek | E05B 73/0076 70/232 |
| 3,808,851 A | * | 5/1974 | Kargus | E05B 73/0076 70/232 |
| 3,848,441 A | * | 11/1974 | Quinley | B63H 20/02 70/232 |
| 4,058,994 A | * | 11/1977 | Coppola | E05B 73/0076 70/232 |
| 4,228,983 A | * | 10/1980 | Bowman, Jr. | E05B 73/0076 248/553 |
| 4,407,146 A | * | 10/1983 | Nielsen, Jr. | F16B 41/005 285/80 |
| 4,658,607 A | * | 4/1987 | Muse, Jr. | E05B 73/0076 248/552 |
| 4,777,809 A | * | 10/1988 | Wiggins | E05B 73/0076 70/19 |
| 4,862,716 A | * | 9/1989 | Derman | F16B 41/005 70/166 |
| 5,027,627 A | * | 7/1991 | Derman | A47B 97/00 70/164 |
| 5,735,147 A | * | 4/1998 | Cattanach | B60R 25/08 137/382 |

* cited by examiner

*Primary Examiner* — Lloyd A Gall
(74) *Attorney, Agent, or Firm* — Mark S Hubert

(57) ABSTRACT

An invertible, boat outboard motor lock that places an impenetrable enclosure around the pivotable arms of a pair of cap screws that are used to frictionally affix a boat motor to the transom of a boat. When in place and locked, access to remove the boat motor from the boat is blocked. The pivotable arms are placed into either end of a trough formed in a unitary block and the assembly is placed into a concave cover housing. The housing may be installed in either of two orientations, 180 degrees apart. A lock cylinder is passed through the housing and block preventing their separation.

7 Claims, 8 Drawing Sheets

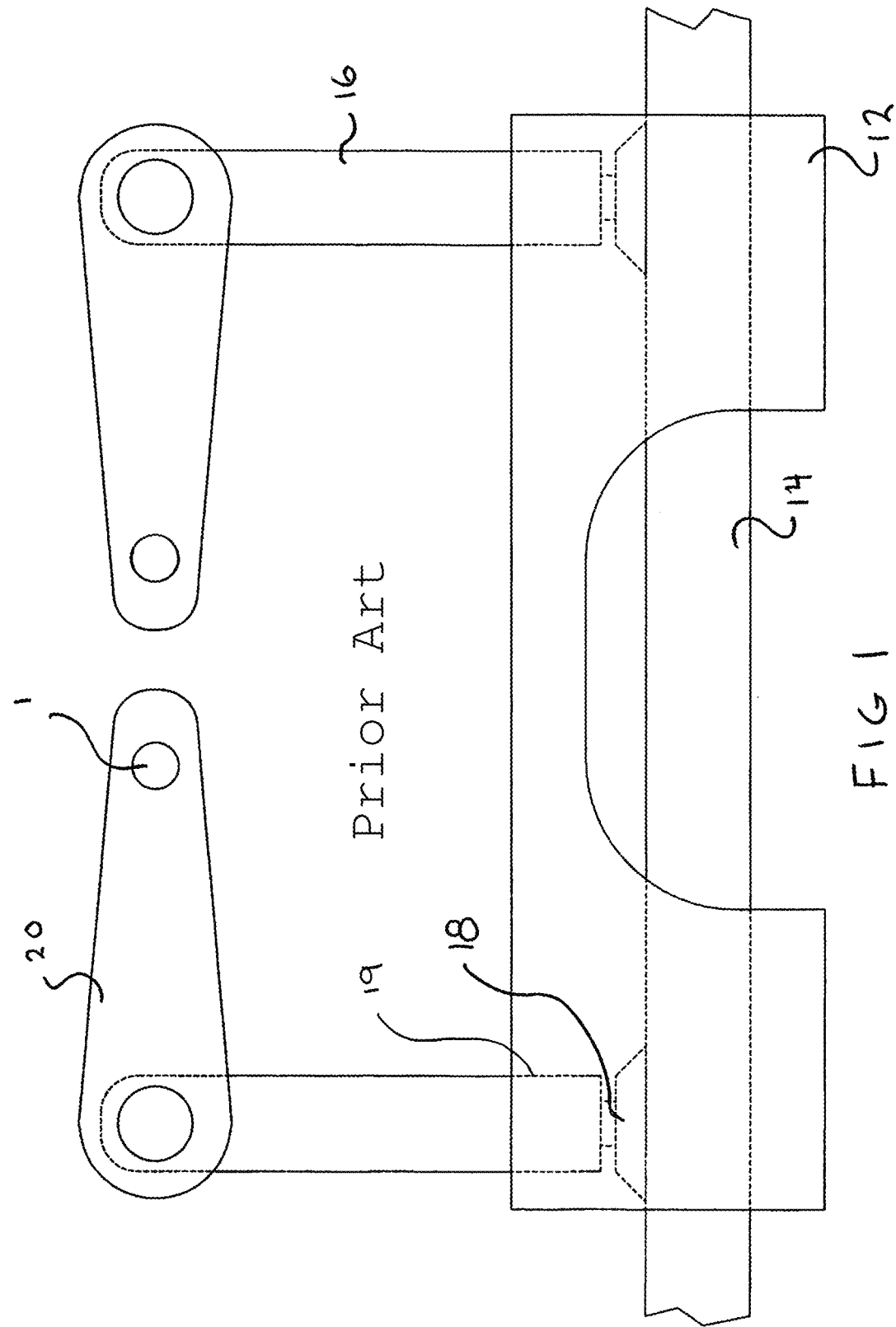

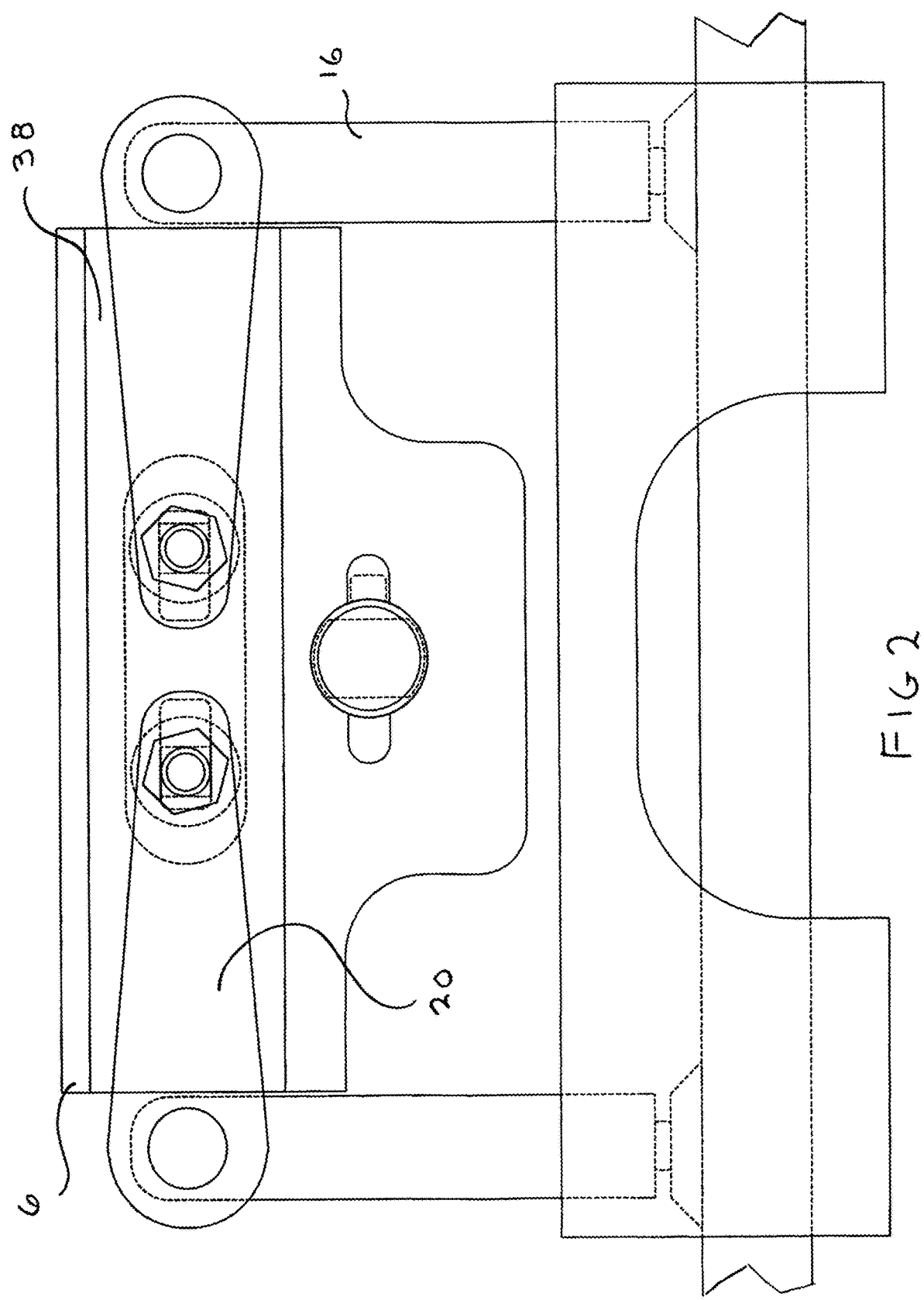

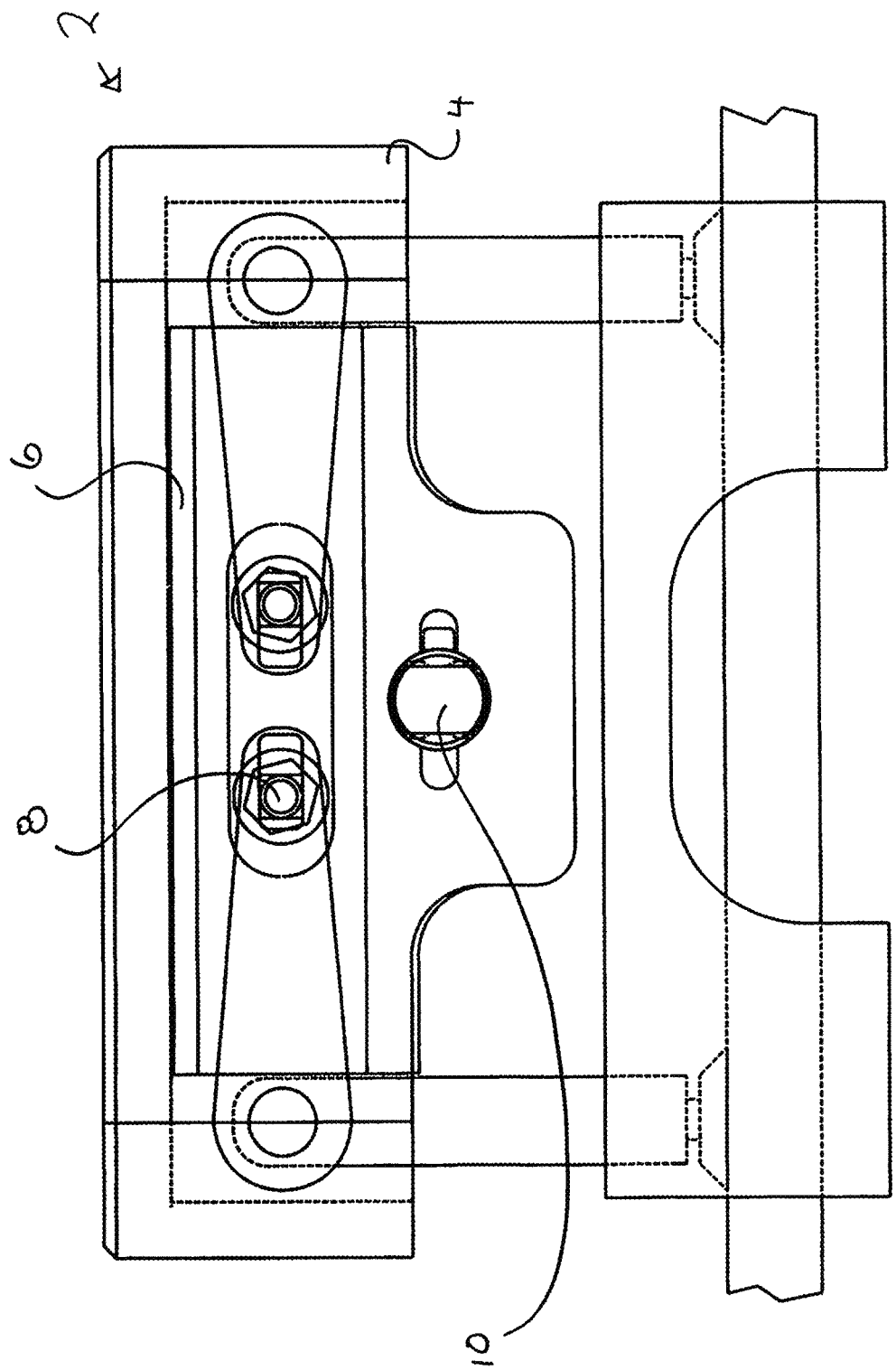

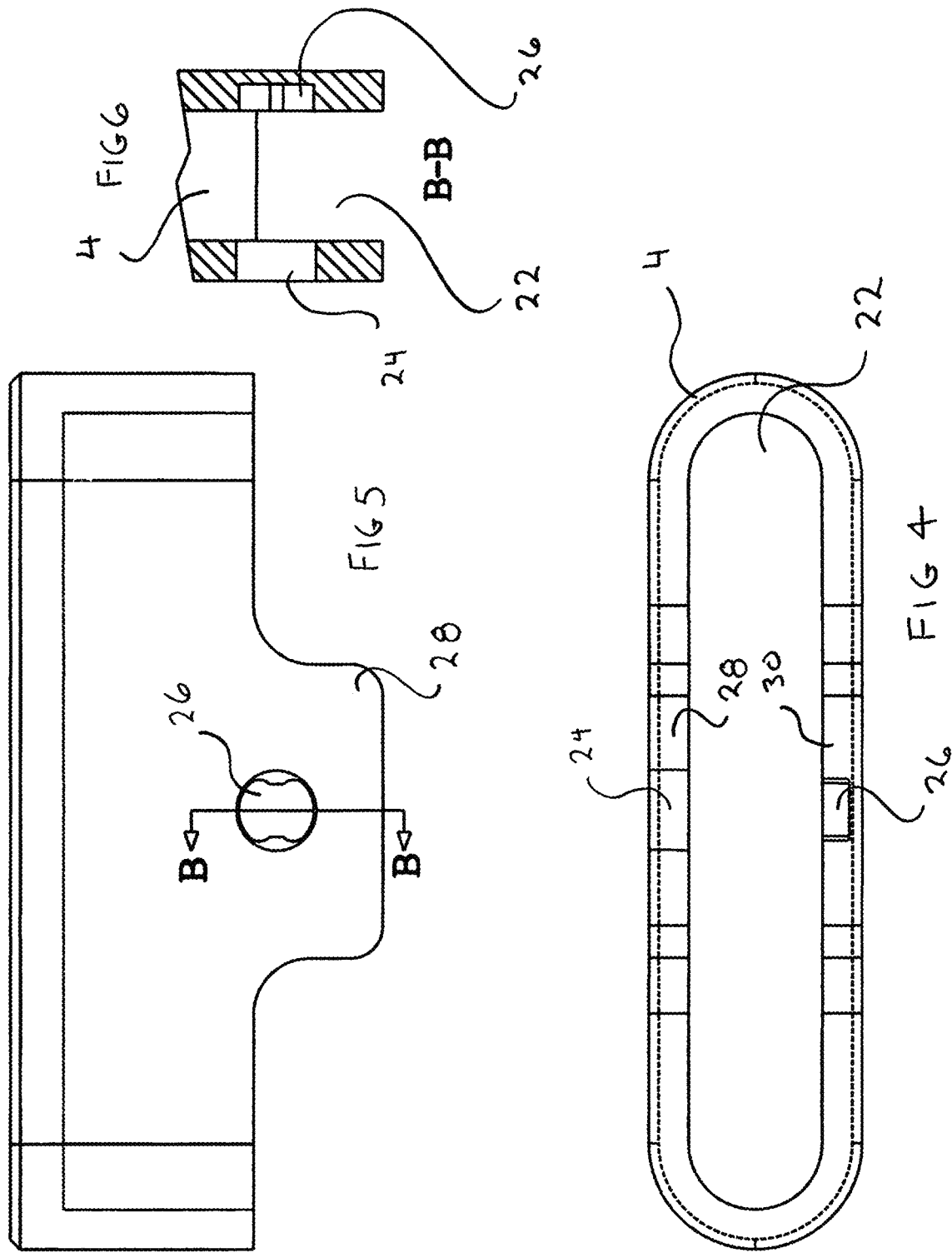

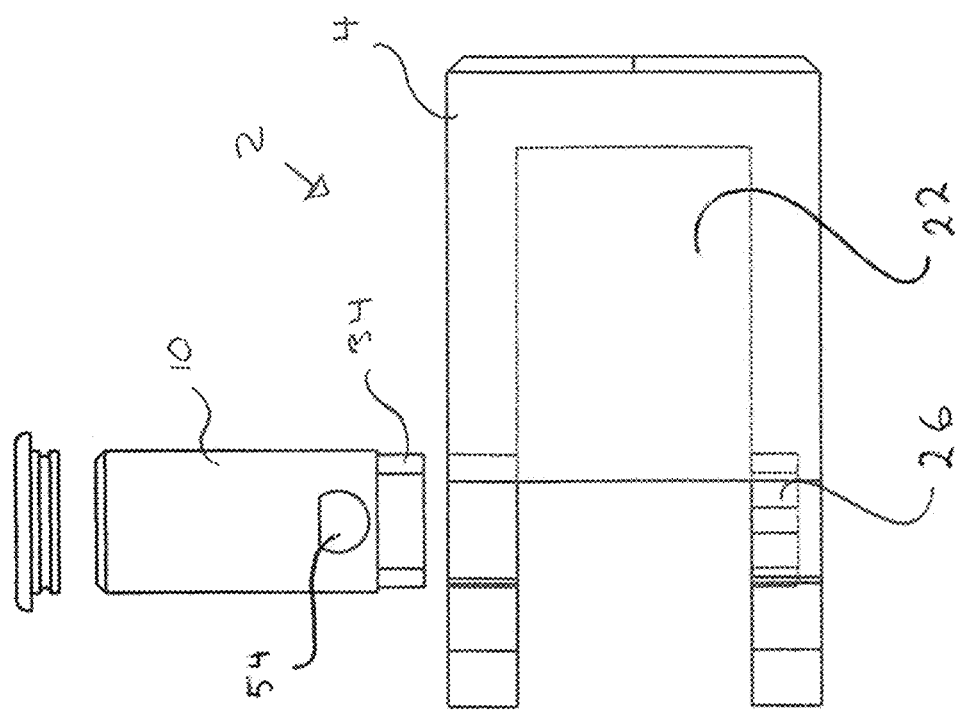
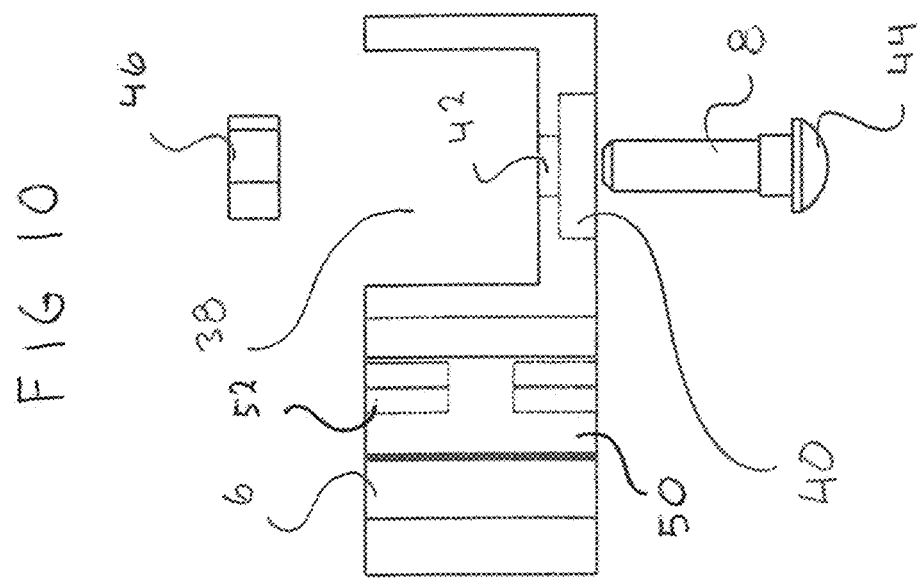
FIG 10

INVERTIBLE BOAT OUTBOARD MOTOR LOCK

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to locking mechanisms, and more particularly to an invertible lock for an outboard boat motor.

BACKGROUND

Small marine outboard motors, such as would be used on fishing boats are expensive and unfortunately, portable. The smaller trolling motors in the 6-10 horsepower range can cost in excess of $5,000 and weigh less than 100 pounds. They are also generally mated to the transom of a boat only by a pair of cap screws. Since boats out of the water are frequently unattended for extended periods of time, these motors create a magnet for thieves.

To remove a small marine outboard motor from a boat out of the water, all the thief need do is disconnect the fuel line (which is connected to the fuel tank with a quick connect release coupling), unscrew the two cap screws on the motor mounting bracket and lift the motor off the boat transom. This can generally be accomplished in less than a minute.

To date the solutions are to drill additional holes through the boat's transom and modify the mounting bracket's capscrews with bolts and to fabricate spacers so the motor can be bolted to the transom. This just slows down the theft process because it only adds the need for bolt cutters. Another solution is to weld the outboard motor mounting bracket to the transom (where the boat is aluminum or steel). This is a great solution, however it requires the welds to be ground off each time the motor has to be serviced, or taken off the boat for storage.

Henceforth, a boat outboard motor lock that can work with a plethora of different manufacturer's motors to secure the motor against theft without modification to the motor or boat, would fulfill a long felt need in the marine industry. This new invention utilizes and combines known and new technologies in a unique and novel configuration to overcome the aforementioned problems and accomplish this.

BRIEF SUMMARY

In accordance with various embodiments, a lock for a boat's outboard motor is provided.

In one aspect, a simplified, lock that may be used on most boat outboard motors without modification to the motor or the boat it is being attached to, is provided.

In another aspect, a boat outboard motor lock that may be installed in either of two different 180 degree orientations after the boat motor mounting bracket has been affixed to the boat transom is provided.

In yet another aspect, a simplistic locking device using a minimal number of parts that are impervious to the marine environment is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 1 is a top phantom view of boat motor mounting bracket affixed to a boat transom;

FIG. 2 is a top phantom view of boat motor mounting bracket affixed to a boat transom with its cap screw arms bolted into the cap screw arm block;

FIG. 3 is a a top phantom view of boat motor mounting bracket affixed to a boat transom with its cap screw arms bolted into the cap screw arm block and the unlocked cover housing affixed thereon;

FIG. 4 is a rear cross sectional view of the cover housing;

FIG. 5 is a top view of the cover housing;

FIG. 6 is a sectional view taken through line B-B of FIG. 5 of the lock tumbler insertion region;

FIG. 10 is an exploded cross sectional view of the motor lock;

DETAILED DESCRIPTION OF CERTAIN EMBODIMENTS

Figure 7:
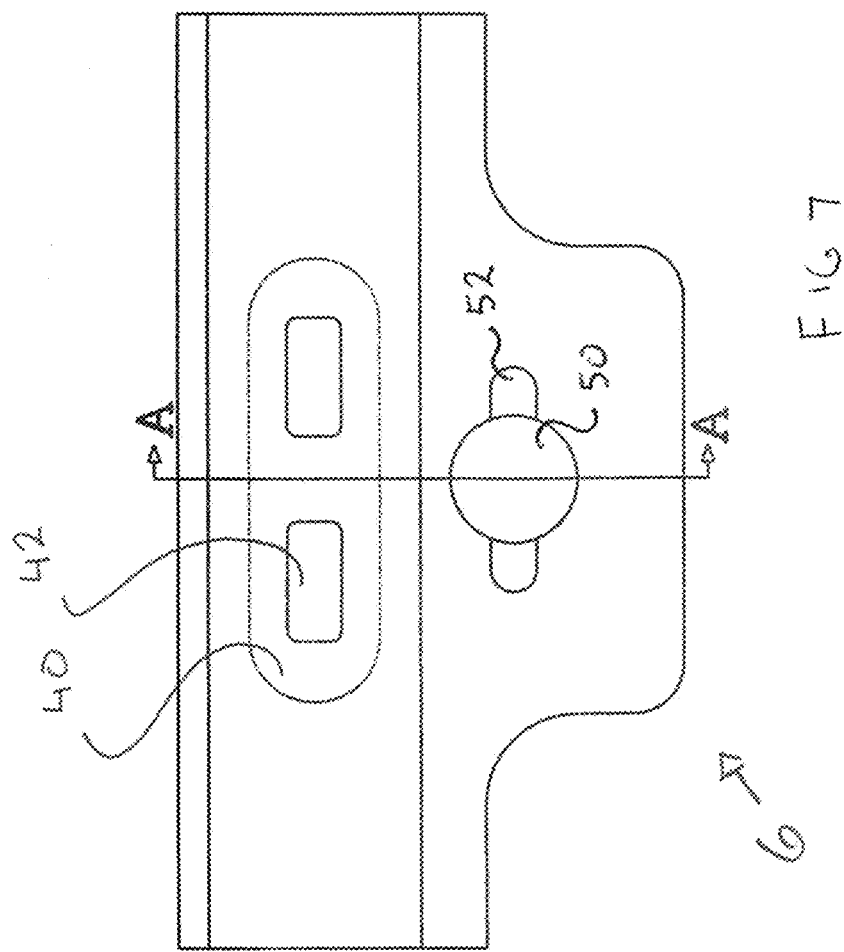
FIG. 7 is a top view of the cap screw arm block.
Figure 8:
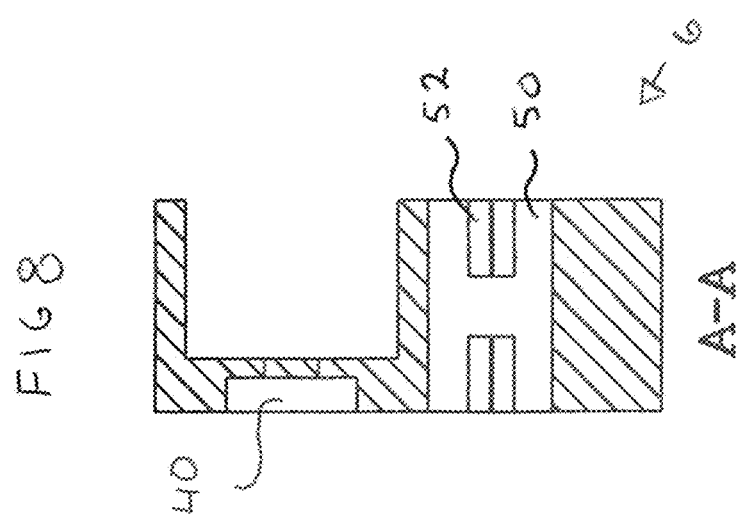
FIG. 8 is sectional view taken through line A-A of FIG. 7 of the lock tumbler insertion region.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiment. It will be apparent to one skilled in the art, however, that other embodiments of the present invention may be practiced without some of these specific details. While various features are ascribed an embodiment, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for an invertible marine outboard motor lock that is designed to accommodate the theft-proof attachment of most manufacturer's motors to the transom of a boat without any physical modifications. It is capable of being installed after the boat motor has been bolted to the transom.

In the way of background, FIG. 1 shows a conventional mounting apparatus coupling a small outboard marine motor to the transom of a boat. At the front of an outboard motor is an inverted U shaped mounting bracket 12 that extends over the boat's transom 14 and mounts the motor to the boat. Through the outermost vertical section of the inverted U shaped mounting bracket are two cap screws 16 that are threadingly engaged in threaded recesses 19 in the mounting bracket so as to rotate and extend into the central region of the bracket 12. As the cap screws 16 are horizontally extended, they contact the transom 14 with their outermost feet 18 and sandwich the transom 14 between the mounting bracket 12 and the cap screws 16 to frictionally engage the motor to the boat's transom. On the front of each of the cap screws 16 is a pivotable arm 20 that may be rotated 90 degrees from the linear axis of the cap screws 16 to rotate the cap screws 16 with sufficient torque to cinch the cap screw feet 18 firmly to the transom.

The motor lock 2 encapsulates both of the mounting bolts (cap screws) of the mounting bracket simultaneously and in a single enclosure, thus preventing anyone to get at the mounting bolts. The cover housing extends closely enough to the mounting bracket to prevent the cutting of any part of the mounting bracket hardware. It has a horizontal orientation that may be rotated 180 degrees atop its cap screw locking block so as to obscure the lock cylinder from view and the entry of unwanted foreign agents such as sand and water.

Looking at FIGS. 3 and 10-12 it can be seen that the motor lock 2 has five components: a cover housing 4; a cap screw locking block 6; a pair of mechanical fasteners 8; and a removable, keyed lock cylinder assembly 10.

Figure 9:
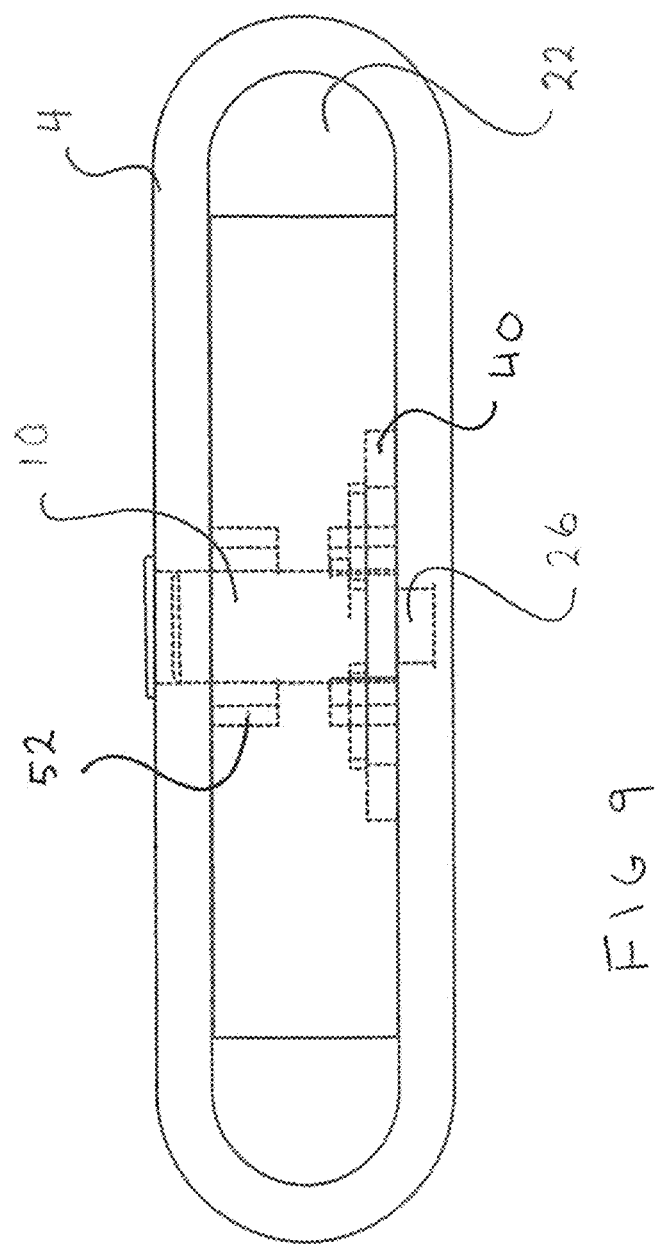
FIG. 9 is a cross sectional view of the assembled motor lock with the lock cylinder internal components removed for visual clarity.
Figure 12:
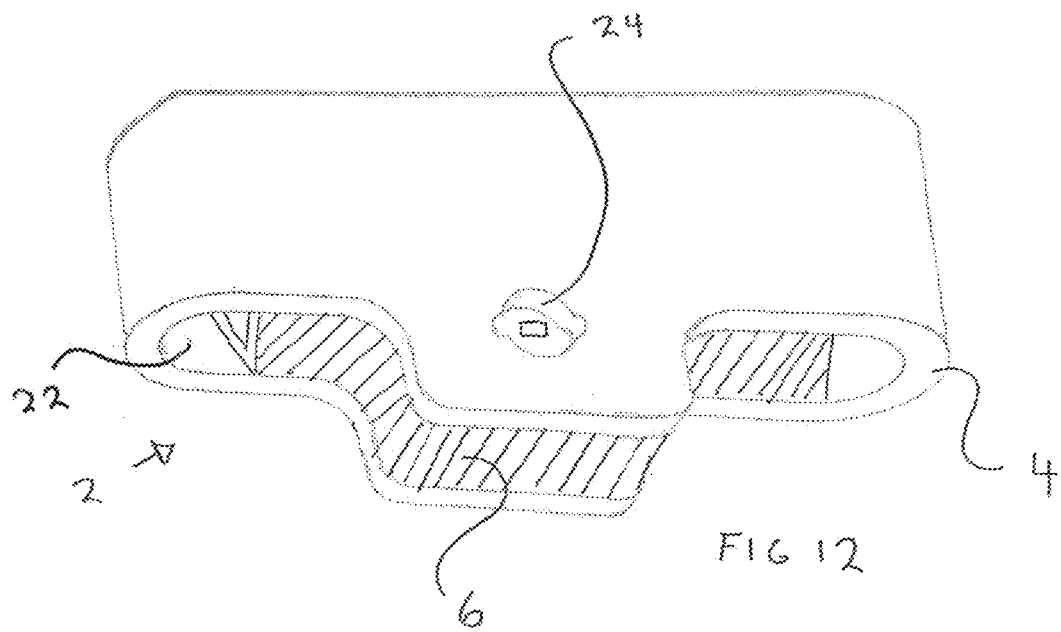
FIG. 12 is a rear perspective view of the motor lock.
Figure 11:
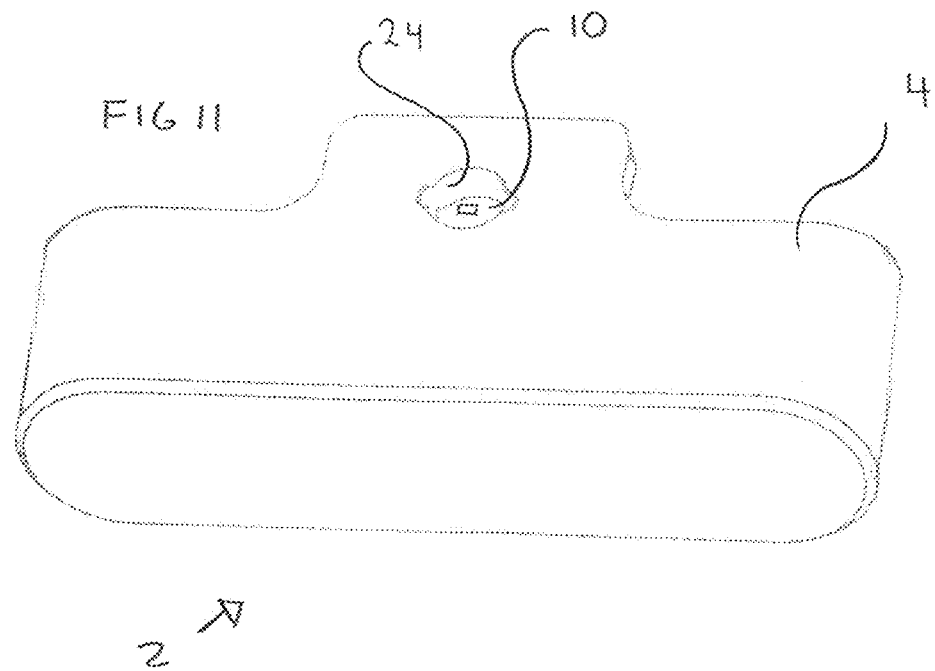
FIG. 11 is a front perspective view of the motor lock.

FIGS. 9 and 10 best show the keyed lock cylinder assembly 10. This is a commercially available unit that has a keyway formed on its bottom end 34 that matingly conforms with a keyseat 26 cut in the cap screw locking block 6. The lock cylinder assembly 10 has a cylindrical body with a central stopped bore housing a rotatable locking mechanism therein. The front face of the locking mechanism has a slot accepting a key, that when inserted and rotates the locking mechanism relative to the cylindrical body, causes a lock pin 54 to extend or retract from an orifice formed in the side of the cylindrical body. The lock cylinder assembly 10 has a length that exceeds the thickness of the cap screw locking block 6. In this way said lock cylinder upon insertion, may reside simultaneously within both the lock cylinder bore and the lock cylinder orifice, locking these two components together.

FIGS. 4, 5 and 9 illustrate that the cover housing 4 is a unitary block of metal, steel or polymer (aluminum in the preferred embodiment) with a double-ended slot machined in its back face so as to leave a concave void 22 in the body of the cover housing 4. The linear axis of the housing 4 and the linear axis of the concave void 22 are coplanar. There is a lock cylinder bore 24 formed in the cover housing perpendicular to the linear axis of the cover housing 4. This lock cylinder bore extends completely from the top face of the cover housing into the concave void 22. There is also a keyseat 26 (a stopped bore) formed partially through the cover housing 4 from the concave void 22, and that is aligned to the axis of the lock cylinder bore 24 (so also to reside perpendicular to the linear axis of the housing 4). The back face of the cover housing 4 has an identical top ear 28 and bottom ear 30 extending there from, contiguous with the top and bottom faces. The lock cylinder bore 24 extends through the top ear 28 only and the keyseat 26 extends partially into the bottom ear 30 only. The keyseat 26 and the bottom end 34 of the lock cylinder 10 (FIGS. 9 and 10) are matingly configured (keyed) such that when the bottom of the key lock cylinder assembly 10 is seated in the keyseat 26 the key lock cylinder assembly 10 cannot rotate when its key is rotated. In the preferred embodiment the housing is an oval block although this configuration is for aesthetics only.

The cap screw locking block 6 can best be explained with reference to FIGS. 2, 3, 7, 8, 10 and 12. It is a unitary block of metal, steel or polymer (HDPE in the preferred embodiment) having generally planar top and bottom faces. The geometric configuration of the cap screw locking block 6 mimics the interior geometry of the concave void 22 in the cover housing, including the area under the ears but it is truncated at either of its ends. There is rectangular trough 38 formed along the entire length of linear axis of the block wide enough to accept the pivotable arms 20 of the two cap screws arm from either end. There is a depressed recess 40 formed in the bottom exterior surface of the cap screw locking block 6 through which is formed two through slots 42 for the passage of mechanical fasteners 8. The depressed recess 40 and the slots 42 intersect the bottom face of the rectangular trough 38 at an approximate right angle. When the pivotable arms are pivoted toward each other at 90 degrees from the linear cap screws 16 and placed into the trough 38, their orifices 1 align with the through slots 42. The mechanical fasteners 8 may be passed through these aligned orifices 1 and slots 42 such that the heads 44 of the mechanical fasteners will reside within the depressed recess 40 and the nuts 46 will reside in the trough 38 above the pivotable arms 20. The heads 44 of the mechanical fasteners have a thickness less than the depth of the depressed recess 40.

The cap screw locking block 6 also has a lock cylinder orifice 50 formed there through. This orifice 50 is sized to accommodate the lock cylinder assembly 10. This orifice 50 has two pair of substantially similar grooves 52 (an upper set and a lower set) cut partially along the depth of its inner surface from the top end of the orifice 50 or from the bottom end of the orifice 50. The grooves in any set are positioned 180 axial degrees apart. These grooves 52 accommodate the extension of the lock pin 54 which is extended perpendicularly from the lock cylinder assembly 10 when the lock cylinder assembly 10 is installed in the orifice 50 and its locking key is rotated. With two grooves in each set, the lock cylinder can be inserted in two different positions from the top or the bottom of the cap screw locking block 6. (Only one groove is necessary to enable the operation of the motor lock.) Since neither pair of grooves 52 extend past the midpoint of the thickness of the cap screw locking block 6 the lock pin would be trapped inside of whichever groove and the lock cylinder assembly could not be removed from the device until the key was rotated and the lock pin retracted.

In operation, after the motor is affixed to the transom of the boat, the arms 20 of the cap screw are pivoted toward each other and placed into the trough 38 of the cap screw locking block 6 such that their orifices 1 align with the two through slots 42 formed in the bottom of the cap screw locking block 6, mechanical fasteners 8 (optional) are passed through the orifices 1 and slots 42 and connected together such that the mechanical fastener's head 44 and nuts 46 entirely reside within the extents of the upper and lower faces of the cap screw locking block 6. The concave void 22 in the cover housing 4 is frictionally engaged over the cap screw locking block 6 until its front face abuts the inner face of the cover housing 4 and the lock cylinder bore 24 aligns with the lock cylinder orifice 50. The lock cylinder bore 24 may align with the lock cylinder orifice 50 from either the top end or bottom end of the orifice 50. This would leave the lock cylinder assembly accessible from the top or the bottom side of the motor lock 2. Once these are aligned, the lock cylinder assembly 10 with its locking pin retracted, is inserted into the aligned components until its bottom end 34 is seated into the keyseat 26. At this time the top end of the lock cylinder assembly 10 resides slightly below or flush with the top edge of the lock cylinder bore 24 but above the top face of the cap screw locking block 6. The key is inserted into the lock cylinder assembly 10 and rotated. The bottom end 34 of the lock cylinder assembly 10 is rotationally constrained in the keyseat 26 allowing the lock pin 54 to extend into the lower of one of the pair of grooves 52 in the orifice 50 in the cap screw locking block 6. The lock pin 54 is now trapped in the cap screw locking block 6 and the lock cylinder 10 cannot be raised. The lock cylinder extends above the top face of the cap screw locking block 6 so as to prevent the removal of the cover housing 4 off of the assembled device. Thus, the pivotable arms 20 cannot be manipulated to rotate the cap screws and remove the motor from the transom of the boat.

It is to be noted that because the mechanical fasteners reside within the cap screw locking block 6, and because there are both upper and lower sets of grooves in the lock cylinder orifice 50, the cover housing 4 may be placed over the cap screw locking block 6 in two different ways. This enables the user to decide if they want the locking cylinder assembly 10 to face up or down in the motor lock 2. The key could thus be inserted from the top of the device or the bottom of the device. This invertible feature of the boat motor lock is useful to obscure the view of the lock from would-be thieves and to prevent salt water, sand or other foreign agents from entering the keyslot in the lock cylinder assembly.

It is important to note that the lock described herein need not utilize any mechanical fasteners in an alternate embodiment. Once the pivotable arms of the cap screw are inserted into the cap screw locking block, they may be inserted frictionally into the housing cover and the lock cylinder installed. The mechanical fasteners just hold the cap screw locking block attached to the cap screws so as to free up the hands of the user for the installation of the cover housing. The mechanical fasteners are not necessary to constrain the pivotable arms within the device.

While certain features and aspects have been described with respect to exemplary embodiments, one skilled in the art will recognize that numerous modifications are possible. Unless the context dictates otherwise, functionality can be distributed among various other system components. System components described according to a particular structural architecture may be organized in alternative structural architectures. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Thus it will be appreciated that the invention is intended to cover all modifications and equivalents within the scope of the following claims.

Having thus described the invention, what is claimed as new and desired to be secured by Letters Patent is as follows:

1. A boat outboard motor lock, comprising:
   a concave housing;
   a cap screw locking block having a linear axis with a linear trough running along a length of said linear axis, a depressed recess on an exterior surface thereof, and two slots formed there through a bottom face of said linear trough, extending there through said depressed recess and intersecting said linear trough at approximately 90 degrees, and
   a lock cylinder;
   two mechanical fasteners each sized for insertion through one of said two slots; and
   wherein said cap screw locking block dimensioned for frictional insertion within said concave housing; and
   wherein said concave housing has a lock cylinder bore that matingly aligns with either of two of a lock cylinder orifice in said cap screw locking block, and said lock cylinder resides simultaneously within both said lock cylinder bore and said lock cylinder orifice.

2. The boat outboard motor lock of claim 1 wherein at least one said lock cylinder orifice in said cap screw locking block has at least one groove formed partially along a depth of said lock cylinder orifice.

3. The boat outboard motor lock of claim 1 wherein said lock cylinder orifices in said cap screw locking block have an upper set and a lower set of substantially similar parallel grooves formed partially along a depth of said lock cylinder orifices.

4. The boat outboard motor lock of claim 3 wherein said grooves do not extend past the midpoint of the thickness of the cap screw locking block.

5. The boat outboard motor lock of claim 4 wherein said concave housing has a keyseat formed on an inner surface thereof, and a bottom end of said lock cylinder is keyed for mating engagement with said keyseat.

6. The boat outboard motor lock of claim 5 wherein said keyseat is aligned with said lock cylinder bore and a lock cylinder orifice.

7. The boat outboard motor lock of claim 6 wherein said lock cylinder has a length that exceeds a thickness of said cap screw locking block and a depth of said keyseat.

* * * * *